United States Patent [19]

Wentworth

[11] 3,875,283

[45] Apr. 1, 1975

[54] SPINNING EPOXIDE CONTAINING ACRYLICS INTO BATHS CONTAINING POLYHYDROXYLS

[75] Inventor: Gary Wentworth, Raleigh, N.C.

[73] Assignee: Monsanto Company, St. Louis, Mo.

[22] Filed: Apr. 5, 1971

[21] Appl. No.: 131,468

[52] U.S. Cl. .............................. 264/182, 264/236
[51] Int. Cl. .............................................. D01f 7/00
[58] Field of Search ............ 264/182, 178, 236, 347

[56] References Cited
UNITED STATES PATENTS

| | | | |
|---|---|---|---|
| 2,908,659 | 10/1959 | Shashoua | 260/32.6 |
| 2,933,460 | 4/1960 | Richter et al. | 264/342 RE |
| 2,955,017 | 10/1960 | Boyer | 264/183 |
| 2,955,907 | 10/1960 | Kolb | 264/184 |
| 3,055,730 | 9/1962 | Robinson et al. | 264/184 |
| 3,088,188 | 5/1963 | Knudsen | 264/182 |
| 3,133,135 | 5/1964 | Ogle | 264/182 |
| 3,231,536 | 1/1966 | Voeks | 264/182 |
| 3,233,026 | 2/1966 | Richter et al. | 264/178 B |
| 3,361,724 | 1/1968 | Watson et al. | 264/184 |
| 3,505,445 | 4/1970 | Leonard et al. | 264/182 |

Primary Examiner—Jay H. Woo
Attorney, Agent, or Firm—Robert L. Broad, Jr.

[57] ABSTRACT

A fiber forming composition comprising acrylonitrile and an epoxide-containing vinyl monomer is herein described wherein the epoxide portion of said monomer is pendant to the polymer chain and thereafter reacted with a polyhydroxyl compound to produce an improved filamentary material. The novel process turns upon forming an epoxide-containing polymer of acrylonitrile and allowing the polymer to undergo an acid-catalyzed reaction in a spin bath containing a polyhydroxyl compound such as polyethylene glycol. The novel compositions herein described have enhanced properties.

6 Claims, No Drawings

SPINNING EPOXIDE CONTAINING ACRYLICS INTO BATHS CONTAINING POLYHYDROXYLS

BACKGROUND OF THE INVENTION

1. Field of the Invention

This invention relates to a method of modifying a polymer of acrylonitrile. More particularly, this invention relates to a novel process for enhancing the physical properties of acrylic polymers and especially the tactile properties of articles formed from such polymers.

2. Description of the Prior Art

Compositions of acrylonitrile and copolymers of 80 or more percent by weight of acrylonitrile and up to about 20 weight percent of a comonomer are conventionally fabricated into fabrics and films. The conventional technique for preparing synthetic fibers from acrylonitrile polymers involves the dissolution of the polymer in a suitable organic solvent and thereafter extruding the solution through a spinneret containing a plurality of orifices, into a medium which removes the organic solvent from the solution and coagulates the polymers in a continuous form. The coagulated forms may be then washed, dried and stretched to orient the polymer molecules.

Filaments and fibers produced in accordance with the prior art procedures have often not possessed all the physical properties desired. It is often the case that these filaments and fibers are lacking in some physical property and do not possess the necessary qualities for certain end uses. In the end product a number of properties are usually considered immediately in assessment thereof and this is often done subjectively in handling and examining such products. Thus, such properties as luster, appearance, smoothness or roughness, softness or limpness and good or poor drape are noted at once. Hand relates to the feel of particular material and embraces firmness, elasticity, fineness softness and resiliency.

A problem with some acrylonitrile filaments and fibers thereof is the lack of softness and the required flexibility in fabrics made from these fibers. Attempts have been made with varying degrees of success to influence the character polymer characteristics through the use of various mono-olefinic monomers copolymerizable with the polymer. Also, attempts to modify the physical and chemical characteristics of such copolymers have been made via admixing different polymeric substances therewith. Further, attempts to modify certain undesirable fiber characteristics have been made by treating the surface of the fiber with different organic and inorganic agents and conditioners. A particular limitation with respect to several types of these techniques is the loss of such modification over a period of time. Accordingly, there is a need for other means which offers enhanced and permanent resistance to changes in fiber tactile properties. Although copolymers may be treated in accordance with this invention for modification of their properties, the process is of special advantage in the treatment of fibers to render them more amenable to textile processing.

SUMMARY OF THE INVENTION

A principal object of this invention is the provision of new methods for forming filamentary materials, particularly textile articles, by an efficient and economical procedure. Another object of the subject invention is the provision of the novel products having unusual properties as are hereinafter described. Another object of this invention is to provide a chemical modification of an acrylic filament during wet spinning. Further objects and advantages of the invention will be obvious from the following description.

It has been found that novel polymers of acrylonitrile may be prepared by polymerizing monomers comprising acrylonitrile and an epoxide-containing vinyl monomer in the presence of an initiator, isolating the polymer, dissolving the polymer in a solvent to form a dope, and extruding the dope to form filaments in a bath containing a polyhydroxyl compound and an activating amount of a catalyst.

A particular feature of the present invention is that essentially permanent modifications of the fiber properties are attained by reacting after extrusion the formed copolymer with the spinning solution.

In producing the novel compositions herein described it is preferable to copolymerize with acylonitrile from about 4 to about 15 percent by weight of polymer of an epoxide-containing vinyl monomer. The epoxide-containing vinyl monomer contemplated herein may be represented by the general formula:

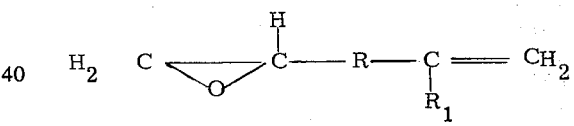

wherein R is a divalent radical of from 1 to about 5 carbon atoms $-CH_2-O-, -CH_2OCO-$ or $-CH_2-O-CH_2-$, and $R_1$ is hydrogen or methyl.

It has been further found that novel compositions produced according to the subject invention are in themselves most useful. The compositions are formed from a copolymer comprising about 85% by weight acrylonitrile, and from about 4 to about 15% by weight of an epoxide-containing vinyl monomer, the epoxide portion thereof being pendant to the copolymer chain, and a polyhydroxyl compound chemically bonded to said epoxide portion, the polyhydroxyl-copolymer being represented by the general formula:

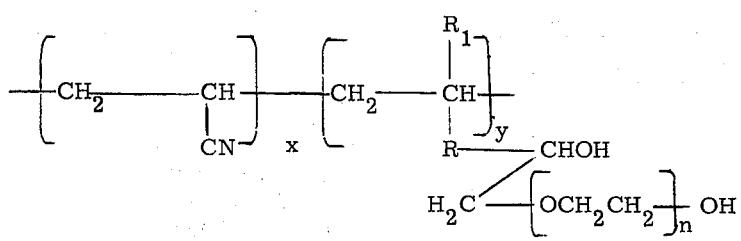

wherein R is a divalent radical of from 1 to about 5 carbon atoms, —CH$_2$OCO—, —CH$_2$—O—, or —CH$_2$—O—CH$_2$—, and R$_1$ is hydrogen or methyl, n having a value of at least about 9, and the sum of x and y having a value greater than 50.

The shaped filamentery article or articles of this invention comprise the aforementioned composition, said article being further characterized by having substantially all of said polyhydroxyl compound chemically bonded within the interior of said filamentary article and substantially no polyhydroxyl compound on the surface of said article.

The epoxide-containing vinyl monomers denoted herein may be represented by the general formula:

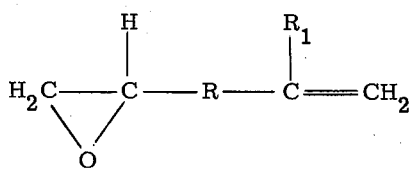

wherein R is a divalent radical of from 1 to about 5 carbon atoms, —CH$_2$O—, —CH$_2$OCO—, or —CH$_2$—O—CH$_2$—, and R$_1$ is hydrogen or methyl. A number of said monomers such as glycidyl acrylate, allyl glycidyl ether, methallyl glycidyl ether are commercially available. In particular, a variety of monoglycidyl ethers containing vinyl unsaturation are available. The epoxide-containing vinyl monomers may be readily synthesized by conventional organic preparations. It is known that such monomers may be conveniently prepared in usually excellent yields by conversion of alkenes to epoxides through the use of organic peracids such as perbenzoic or monoperphthalic acids in dioxane. In addition, such monomers may be synthesized by employing peracetic acid in acetic acid solution for the oxidation of alkenes to epoxides or resort may be had to 30% hydrogen peroxide additions to a solution of the alkenes in formic acid to effect the epoxidation of unsaturation.

The polymerization reaction may be initiated by means of any free radical-producing initiator. Suitable initiators include the water-soluble peroxy compounds, for example, hydrogen peroxide, sodium peroxide, sodium perborate, sodium persulfate and other alkali metal salts of peroxy acids, or other water-soluble peroxy compounds. Also initiators, such as azo-2,2'-diisobutyronitrile may be used advantageously in the polymerization. A wide variation in concentration of initiators may be used depending on the temperature of polymerization, the concentration of monomers in the reaction mass, and the molecular weight desired of the polymeric materials. From about 0.1 to 5.0 percent by weight, based on the monomer, of initiator may be used. The initiator may be charged at the outset of the reaction, or it may be added continuously, or in increments, throughout the reaction for the purpose of maintaining a more uniform concentration of initiator in the reaction mass. The latter method is preferred because it tends to make the resultant polymer more uniform in its chemical and physical properties. In general, it is desirable to have a uniform reaction rate and therefore a substantially uniform concentration of the initiator is desired throughout the polymerization. Again, the useful polymers are those of 80 to about 98 percent of acrylonitrile and from four to about 15 percent the epoxide-containing vinyl monomer. It may be worth mentioning that since glycidyl ethers may hydrolyze when present in large proportions in the polymerization reaction vessel, the copolymers of from two to about ten percent have been found to be most useful. The quantity of the such comonomers present in the polymerized form in the acrylonitrile polymer must necessarily be relatively small, since generally at least 80 percent of acrylonitrile is required to produce fibers with desirable tensile properties, and at least 4 percent of the epoxide-containing vinyl monomer is required. Accordingly, interpolymers of up to about 18 percent of the unsaturated monomers, or mixtures of said monomers, are useful.

If it is desired to use additives or other agents, such as dyes, anti-static agents, lubricants, optical brighteners, delusterants, heat and light stabilizers, plasticizers and the like in the copolymeric solutions, they may be incorporated therein without danger of seriously affecting the general properties of the end product. Thus, although a uniform distribution of reactants throughout the reaction mass may be readily achieved by vigorous agitation, it may be generally desirable to promote the uniform distribution of reagents by using wetting agents or emulsion stabilizers. Further, the amount of such agents depends upon the particular agent selected, the ratio of monomer to solvent, and the conditions of polymerization. It may be stated that rotary stirring devices are generally the most effective means of insuring the intimate contact of the reagents, but other means may be successfully employed, for example, by rocking or tumbling the reactor or polymerization vessel.

The optimum polymerization for fiber formation often involves the use of polymerization regulators to prevent formation of polymer units of excessive molecular weight. Suitable regulators which may be used in this invention are the alkyl and aryl mercaptans, carbon tetrachloride, chloroform, dithioglycidol and phenols. The regulators when employed may be used in amounts varying from 0.001 to about two percent of the weight of the monomers to be polymerized.

Monomers that may be polymerizable with acrylonitrile and epoxide-containing vinyl monomer are the monoolefinically unsaturated monomers and are exemplified by compounds such as methyl acrylate, ethyl acrylate, butyl acrylate, methoxy methyl acrylate, methyl methacrylate, vinyl bromide, methacrylonitrile, acrylamide, methacrylamide, methyl vinyl ketone, vinyl acetate, styrene, 2-methyl-5-vinylpridine, vinylidene chloride and other vinyl monomers known to those skilled in the art.

The polymers may be prepared by solution copolymerization in suitable organic solvents, such as dimethyl sulfoxide. Further, the polymers of this invention may be prepared at pH 5–8 using bulk, suspension or aqueous emulsion techniques generally known in the art of vinyl polymerization. Polymerization may be carried out by continuous, semi-continuous and batch polymerization techniques.

The polymeric material taken from the polymerization vessel is thereafter separated or isolated by filtration or other means well-known in the art. The isolated polymer may thereafter be washed and dried. The resulting polymer may require washing operations to remove traces of soluble catalyst or dispersing agents.

The isolated polymer which is generally in a solid granular state may be dissolved to form a spinning solution or dope in conventional organic solvents such as dimethylacetamide, dimethylformamide, dimethylsulfoxide, ethylene carbonate and gammabutyrolactone.

The polymeric solution or dope is then extruded to form filaments by wet spinning methods. Fibers of the compositions herein are produced by extruding the polymer solution through a spinneret or die having a plurality of orifices, into a medium to be hereinafter disclosed, the medium causing the polymer to precipitate into a continuous linear form. The volume of solution that passes through a spinneret in a given time should be constant in order to produce a fiber of uniform size. It is also advantageous to pass the solution, which has usually been prefiltered, through one or more additional filters before passing through the spinneret in order to remove any last traces of foreign matter and particles of incompletely dissolved polymer. It should be mentioned that the extruding operation should be operated at elevated temperatures, but well below the boiling point of the solvent employed to form the dope.

Heretofore, the various solvents and aqueous which have been utilized in acrylic spin baths are relatively unreactive with acrylic polymers these compositions merely removing solvent from the filaments to coagulate them. According to this invention the extruded polymeric material is passed through a bath containing a polyhydroxyl compound under such conditions as temperature and rate to react the extruded material with said compound. The polyhydroxyl compounds may be denoted by the following general formula:
H(OCH$_2$—CH$_2$)$_n$—OH
wherein $n$ is a integer of from 8 to 35.

Examples of polyalkylene glycol compounds included within the scope of the aforenoted general formula and which are suitable for the purpose of the present inventions include the condensation products of ethylene oxide with water or alcohols, viz., polyethylene glycol and such compounds as polypropylene and polybutylene glycols and the monoalkyl ethers of the above polyalkylene glycols.

The polymeric material of the instant invention consists essentially of polymeric chains derived from at least two polymerizable monomers, one of which being acrylonitrile and the other being an epoxide-containing vinyl monomer. After polymerization the structure of the polymeric chain is such that a number of epoxide groupings are pendant thereto and are chemically attached through an oxygen linkage to the polyhydroxyl compound aforementioned to form a branched chain having one end free. Thus, copolymers of acrylonitrile with a glycidyl vinyl ether when reacted with polyethylene glycol would take the following course:

An unusual and distinctive characteristic of the subject polymeric material is that essentially all of the polyhydroxyl compound is chemically incorporated in the interior of the fiber structure. Analytical and diffusivity studies bear this out. Although not limited to this theory, it is believed that this unexpected characteristic is due in part to diffusion as opposed to an exclusive mechanism of syneresis during the coagulation process.

Suitable catalysts to be used in conjunction with the polyhydroxy compounds include mineral acids as well as organic acids. Illustrative examples include acetic acid, chloroacetic and p-toluenesulfonic acid. The catalyst concentration may be varied without adverse effects; however, amounts ranging from 0.001 to 0.10% by weight may be advantageously employed.

Preferably, the amount of the polyhydroxy compound in the spinning bath may be between about 70 to 100% by weight. A number of organic substances may be used in conjunction with the polyhydroxy compound. Solvents which may be used include dimethylformamide, dimethylacetamide and other compatible organics.

The following examples in which parts and percentages are given by weight unless otherwise indicated, illustrate preferred methods of preparing filamentary structures in accordance with the principles of this invention. The invention is not to be limited by the details set forth in the following examples.

EXAMPLE 1

In a 3 liter flask equipped with a reflux condenser and stirrer, 180 gm., of acrylonitrile, 20 gm., of glycidyl acrylate, 3.5 gm., of azobis (isobutyronitrile) and 1000 gm., of dimetnyl sulfoxide were combined, resulting in a clear liquid. The solution was subsequently heated to 55° C., for 23 hours and hereafter the viscous material was coagulated in methanol in a Warning blender and thereafter isolated by filtration and dried in a vacuum oven. A 81% conversion was obtained. The polymer had a specific viscosity, measured in dimethyl formamide at 25° C., 0.1 g/dl, of 0.293. Analysis of the copolymer showed about 87% by weight acrylonitrile.

A 15% total solids spinning dope of the acrylonitrile-glycidyl acrylate copolymer was intimately mixed in powdered form with a solvent, dimethyl sulfoxide, and warmed until a clear liquid resulted. The resulting spinning dope was cooled to about 50° C., filtered and extruded through a spinneret submerged in a coagulating bath composed of polyethylene glycol having an average molecular weight of 1500 to which has been added 0.007 weight percent paratoluene sulfonic acid. The temperature of the bath liquid was about 95° C. The fil-

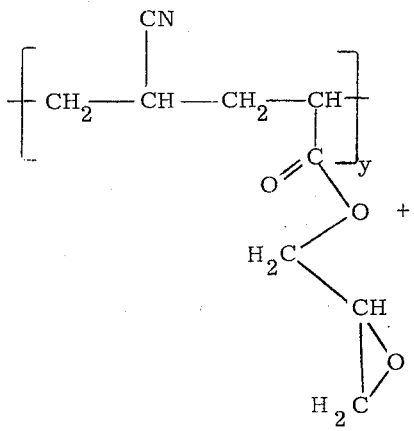
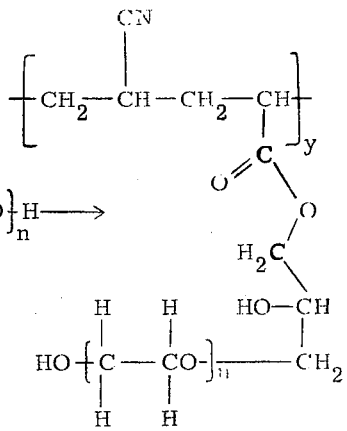

aments so formed were withdrawn from the coagulation bath after a travel therein of about 18 inches and thereafter directed through a bath of boiling water where a stretch of about 4.0 times was imparted to the filaments. Thereafter, the filaments were dried by passing them around rotating drying rolls maintained at a temperature of about 140° C. The filaments were cut into two-inch staple and carded. Determinations of fiber properties indicated a tenacity of 3.54 g/denier and an elongation of 33%. The hand was very waxy and extremely soft, and was likened to cashmere. The cashmere-like hand of the fiber (carded staple) was retained after several rinsings in distilled water.

A portion of the polymer was dissolved in dimethyl formamide and reprecipitated into methanol in a Warning blender. Analysis of the resulting polymer showed 76% by weight acrylonitrile and 11% by weight chemically bonded polyethylene glycol.

A negative iodine absorption test indicated that no polyethylene glycol was present on the fiber surface. The test was conducted by placing a quantity of elemental iodine in a ten inch glass vacuum desiccator wherein fiber to be tested was supported. No brown iodine-ethoxy ether complex was formed on the surface of the fiber.

EXAMPLE 2

A 22% total solids spinning solution of an acrylonitrile-glycidyl vinyl ether copolymer (96/4 weight ratio) in dimethyl sulfoxide was prepared and spun into polyethylene glycol having an average molecular weight of about 1600 to which 0.02 percent by weight para-toluenesulfonic acid was added. A portion of the resulting fiber was dissolved in dimethyl formamide and reprecipitated into methanol in a Warning blender. Analysis of the polymer indicated about 92% by weight acrylonitrile. Infrared spectral analysis shown the presence of polyethylene glycol. Since the original polymer, before spinning, contained 96% by weight acrylonitrile, the fiber contained about 4% by weight permanently bonded polyethylene glycol. A negative iodine sublimation test was obtained. Fibers of this example had a cashmere-like hand.

I claim:

1. A method of preparing acrylic filaments comprising: polymerizing monomers to form a polymer comprising at least 85% by weight acrylonitrile and from about 4% to about 15% by weight of an epoxide-containing vinyl monomer represented by the general formula:

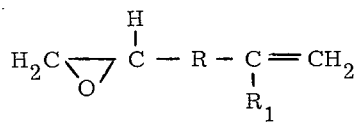

wherein R is a divalent radical of from 1 to about 5 carbon atoms, —$CH_2$—O—, —$CH_2OCO$— or —$CH_2$—O—$CH_2$—, and $R_1$ is hydrogen or methyl, in the presence of a free radical-producing initiator the epoxide portion of the epoxide-containing vinyl monomer being pendant to the polymer chain,
isolating the polymer,
dissolving the polymer in a solvent to form a dope, and
extruding the dope to form filaments in a bath containing a polyhydroxyl compound and an activating amount of a catalyst to effect a chemical bond between said epoxide portion and the polyhdyroxyl compound.

2. A method as recited in claim 1 wherein the monomers include vinyl acetate, vinyl bromide, vinylidene chloride and methyl acrylate incorporated into the polymer chains and being present in a total amount less than about 10% by weight of the polymer.

3. A method as recited in claim 1 wherein the polymerization is carried out in dimethyl sulfoxide and the initiator is azobis (isobutyronitrile) or benzoyl peroxide.

4. A method as recited in claim 1 wherein the polymerization is carried out in an aqueous suspension at a pH between about 5 to about 8 and the initiator is potassium persulfate and sulfur dioxide, 5. A method as recited in claim 1 wherein the polyhydroxyl compound is polyethylene glycol having a molecular weight of at least about 400.

6. A method as recited in claim 1 wherein the bath contains a catalytic amount of p-toluenesulfonic acid.

* * * * *

UNITED STATES PATENT OFFICE
CERTIFICATE OF CORRECTION

PATENT NO. : 3,875,283
DATED : April 1, 1975
INVENTOR(S) : Gary Wentworth

It is certified that error appears in the above-identified patent and that said Letters Patent are hereby corrected as shown below:

Col. 1, line 44, delete "the character";

Col. 1, line 50, delete "undesirable";

Col. 1, just below line 55, delete "C-14-53-26".

Col. 2, line 2, after "although" insert ---acrylonitrile---.

Col. 5, line 21, after "aqueous" insert ---compositions---;

Col. 5, line 23 reads:

"unreactive with acrylic polymers these compositions"

this line should read as follows:

---unreactive with acrylic polymers, these compositions---;

Col. 5, line 32, "35" should read ---10---.

Col. 6, line 34, "dimetnyl" should read ---dimethyl---.

Col. 7, line 37, "shown" should read ---showed---.

Signed and Sealed this sixteenth Day of December 1975

[SEAL]

Attest:

RUTH C. MASON
Attesting Officer

C. MARSHALL DANN
Commissioner of Patents and Trademarks